US011735911B2

United States Patent
Harke et al.

(10) Patent No.: US 11,735,911 B2
(45) Date of Patent: Aug. 22, 2023

(54) POWER SHARING COORDINATION OF PARALLELED SOURCES

(71) Applicant: Hamilton Sundstrand Corporation, Charlotte, NC (US)

(72) Inventors: Michael C. Harke, DeForest, WI (US); William S. Heglund, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 58 days.

(21) Appl. No.: 17/569,553

(22) Filed: Jan. 6, 2022

(65) Prior Publication Data

US 2022/0376498 A1 Nov. 24, 2022

Related U.S. Application Data

(62) Division of application No. 17/327,921, filed on May 24, 2021, now Pat. No. 11,355,929.

(51) Int. Cl.
*H02J 1/12* (2006.01)
*B64D 41/00* (2006.01)

(52) U.S. Cl.
CPC .............. *H02J 1/12* (2013.01); *B64D 41/00* (2013.01); *B64D 2221/00* (2013.01)

(58) Field of Classification Search
CPC .......... H02J 1/12; H02J 2310/44; H02J 1/106; B64D 41/00; B64D 2221/00; Y02T 50/40
See application file for complete search history.

(56) References Cited

U.S. PATENT DOCUMENTS

| 7,157,890 | B1 | 1/2007 | Kris |
| 7,936,086 | B2 | 5/2011 | Yue et al. |
| 10,205,415 | B2* | 2/2019 | Blackwelder ............. H02P 9/14 |
| 10,691,149 | B2* | 6/2020 | Buffenbarger ......... B64D 41/00 |
| 2014/0167516 | A1 | 6/2014 | Gataric et al. |
| 2016/0036220 | A1 | 2/2016 | Lacaux et al. |
| 2020/0382030 | A1 | 12/2020 | Legros et al. |
| 2021/0091564 | A1 | 3/2021 | Rashidi et al. |

OTHER PUBLICATIONS

European Search Report for Application No. 22175243.9, dated Oct. 24, 2022, 9 pages.
Xu et al., "Current Sharing in the High Voltage DC Parallel Electric Power System for the More Electric Aircraft," Intl Conf on Electrical Systems for Aircraft, Railway, Ship Propulsion and Road Vehicles & Intl Trans Electrification Conf, 2016, 6 pages.

* cited by examiner

*Primary Examiner* — Daniel Cavallari
(74) *Attorney, Agent, or Firm* — Cantor Colburn LLP

(57) ABSTRACT

Systems for power sharing coordination of parallel sources are provided. Aspects include a first DC power supply, a second DC power supply, a first generator controller configured to operate the first DC power source, a first current sensing device coupled between the first DC power supply and the common bus point, a second current sensing device coupled between the common bus point and a load, wherein the first generator controller is configured to receive a first current signal from the first current sensing device, receive a second current signal from the second current sensing device, determine a load share percentage for the first DC power supply, determine a first voltage adjustment based on the first current signal, the second current signal, and the load share percentage, and operate the first DC power supply to adjust a first voltage output by the first voltage adjustment.

10 Claims, 3 Drawing Sheets

POWER SHARING COORDINATION OF PARALLELED SOURCES

CROSS-REFERENCE TO RELATED APPLICATIONS

This application is a division of U.S. application Ser. No. 17/327,921 filed May 24, 2021, which is incorporated herein by reference in its entirety.

BACKGROUND

The present invention generally relates to parallel direct current (DC) sources, and more specifically, to power sharing coordination of paralleled sources.

Aircraft require electrical power to operate many parts of the aircraft system, including on-board flight control systems, lighting, air conditioning etc. The current and future generations of aircraft use more and more electrical control in place of conventional hydraulic, pneumatic etc. control. Such more electric aircraft (MEA) have advantages in terms of the size and weight of the controls and power systems as well as in terms of maintenance and reliability.

Most current large commercial aircraft use electricity, on-board, in the form of an AC fixed frequency and/or variable frequency network. Steps have been made to move from 115 V ac to 230 V ac and more recent developments have allowed power supplies to supply high voltage dc (HVDC) e.g. +/−270 V dc, providing improvements in terms of additional functionality, power supply simplification, weight savings and thus fuel efficiency.

Generally, voltage is provided on board an aircraft in one of two (or more) ways. When the aircraft is on the ground, power comes from an external ground generator supplying, say 115 V ac at 400 Hz. An auto-transformer rectifier unit (ATRU) rectifies the supply voltage to provide voltages required for the different loads on the aircraft. Instead of an ATRU, the power can be rectified by active rectification using power flow controllers.

When the aircraft is in the air the power comes from the aircraft engine or auxiliary power unit (APU) via a three-phase ac generator that could then be rectified. The rectified power is provided to a so-called DC bus.

BRIEF DESCRIPTION

Embodiments of the present invention are directed to a system. A non-limiting example of the system includes a first direct current (DC) power supply including a first generator and a first rectifier circuit, a second DC power supply, wherein a first output of the first DC power supply and a second output of the second DC power supply are commonly coupled at a common bus point, a first generator controller configured to operate the first DC power source, a first current sensing device coupled between the first output of the first DC power supply and the common bus point, a second current sensing device coupled between the common bus point and a load, wherein the first generator controller is configured to receive a first current signal from the first current sensing device, receive a second current signal from the second current sensing device, determine a load share percentage for the first DC power supply, determine a first voltage adjustment value based on the first current signal, the second current signal, and the load share percentage, and operate the first DC power supply to adjust a first voltage output of the first DC power supply by the first voltage adjustment value.

Embodiments of the present invention are directed to a system. A non-limiting example of the system includes a first direct current (DC) power supply including a first generator and a first rectifier circuit, a second DC power supply, wherein a first output of the first DC power supply and a second output of the second DC power supply are commonly coupled at a common bus point, a first generator controller configured to operate the first DC power source, a first current sensing device coupled between the first output of the first DC power supply and the common bus point, a second current sensing device coupled between the common bus point and a load, a supervisory controller communicatively coupled to the first generator controller, wherein the supervisory controller is configured to receive a first current signal from the first current sensing device, receive a second current signal from the second current sensing device, determine a first voltage adjustment value for the first DC power supply based on the first current signal and the second current signal, and command the first generator controller to operate the first DC power supply to adjust a first voltage output of the first DC power supply by the first voltage adjustment value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, in the interest of brevity, many conventional implementation details are only mentioned briefly herein or are omitted entirely without providing the well-known system and/or process details.

Figure 1:
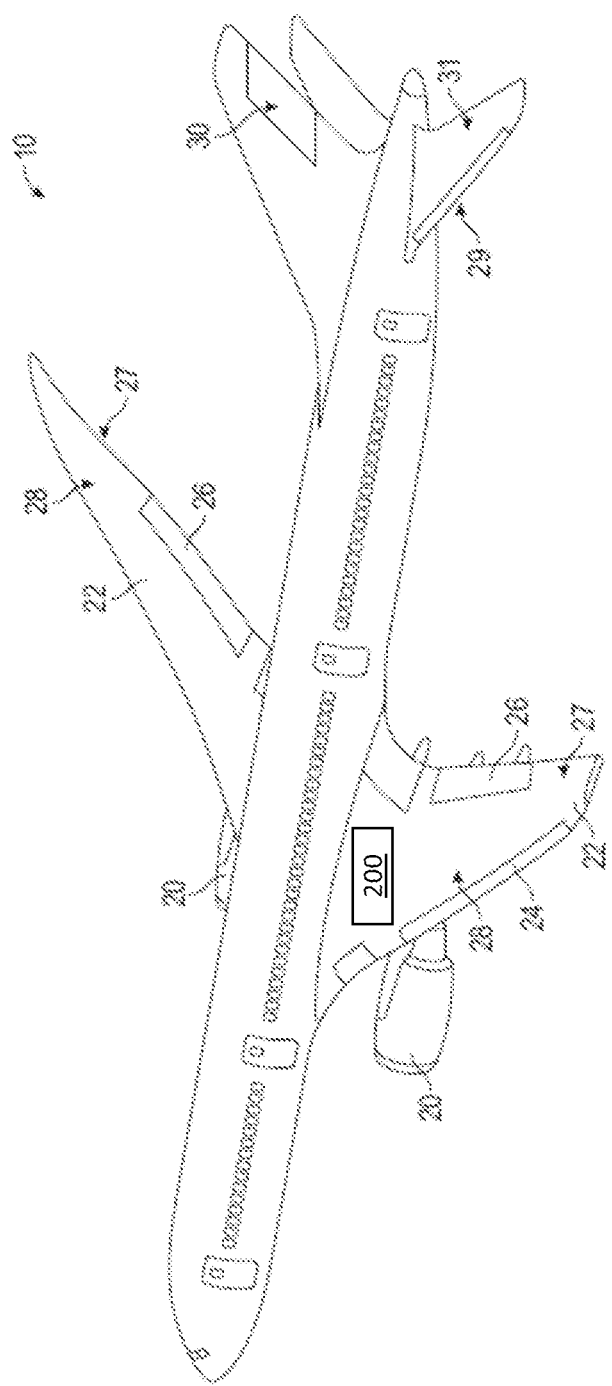
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes a system 200 (described in greater detail in FIG. 2) which allows for power sharing coordination for parallel sources according to one or more embodiments. The parallel sources can supply power to a DC bus that provides power for a variety of power applications on the aircraft.

Turning now to an overview of technologies that are more specifically relevant to aspects of the disclosure, when the aircraft is in the air the power comes from an electric power generating system (EPGS) which typically includes one or more generators. An example generator includes, but is not limited to, permanent magnet generators (PMG) that include permanent magnets mounted on a rotating shaft driven by a prime mover such as the turbine engine on the aircraft. The power generator from these generators can be rectified to provide a DC power supply to power a DC bus on the aircraft. In some instances, it may be desirable to have two (or more) DC power supplies operating in parallel to provide DC power to the DC bus. This allows for the DC power bus to provide more power for large loads such as an electrical propulsion system.

Using parallel DC power supplies provide flexibility when there is a demand for a high load current that is more than a single DC power supply can provide. Advantages of the parallel supplies versus using a larger DC power supply includes the ability for independent channel operation, installation flexibility & the load management configuration.

However, two or more DC power supplies connected in parallel do not automatically share a load equally. Even if the power supplies are identical, the output voltages will be slightly different due to component tolerances and a variety of other factors. The power supply with the higher output will typically provide the entire load current, operating at its limit while the other power supply essentially does very little work. This scenario is not optimal because it essentially overloads a power supply which could cause the power supply to fail at a faster rate.

In one or more embodiments, aspects described herein address power sharing amongst parallel DC power supplies by providing a power sharing coordination system and associated methodology for operation. A supervisory controller is utilized to coordinate power sharing among paralleled DC power sources. When two sources are paralleled, the amount of power drawn from each source depends on the characteristics of the generator controllers. Aspects herein include the introduction of a supervisory controller that interacts with the individual generator controllers to either adjust the generator controller's command or their gain to achieve a desired power sharing amongst the parallel DC sources.

In one or more embodiments, the supervisory power controller can be implemented in both an actively power regulated paralleling scheme and a passively regulated paralleling scheme. In an active power regulated paralleling scheme, each individual generator controller takes into account the entire load on the system (i.e., the summed load of the other DC power sources) when regulating the load sharing portion of the system load. In a passive power regulated paralleling scheme, each individual generator controller only takes into account the load information of the individual power source when regulating the generator power.

Figure 2:
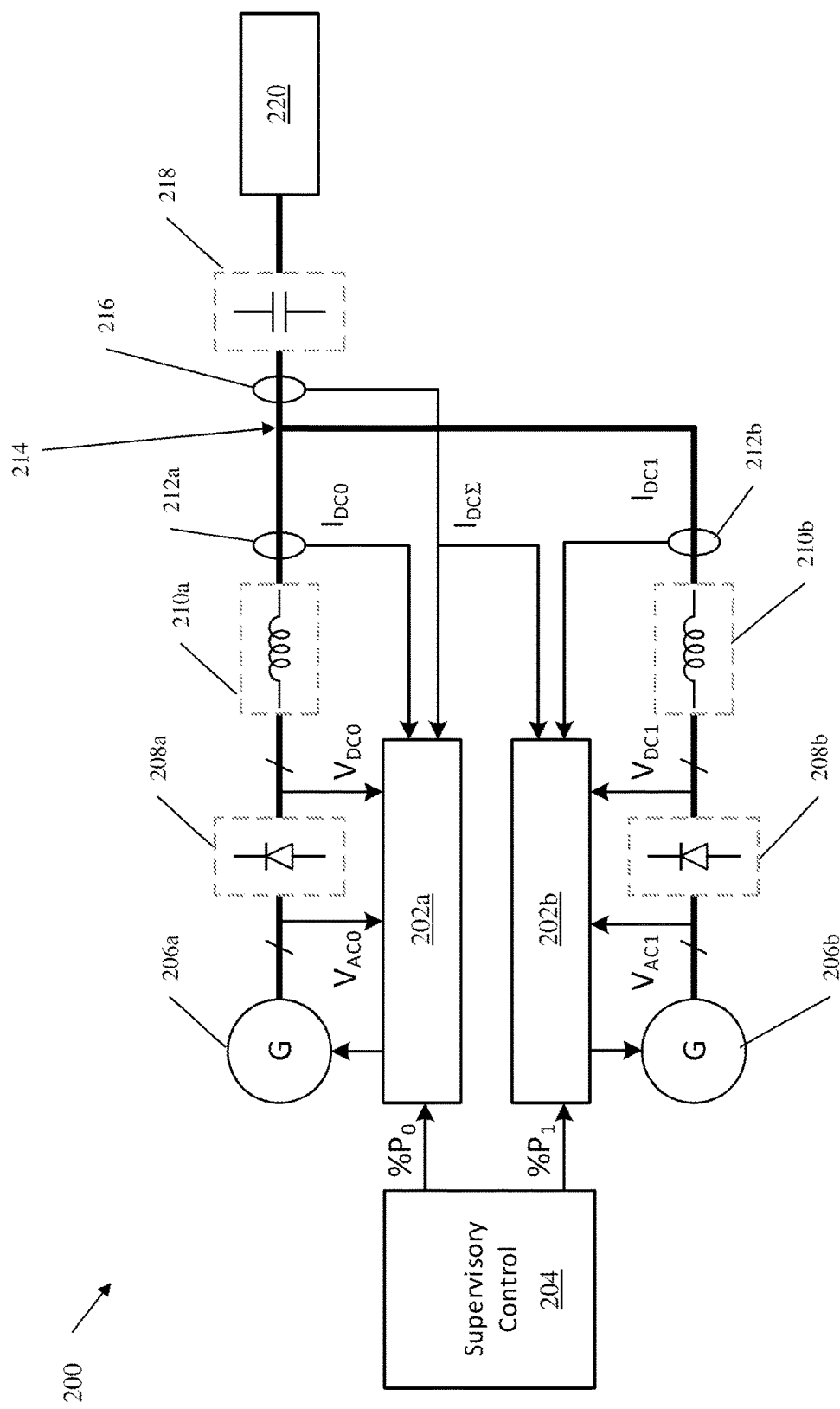
FIG. 2 depicts a block diagram of a system utilizing a supervisory controller for active power regulation of parallel DC sources according to one or more embodiments.

FIG. 2 depicts a block diagram of a system utilizing a supervisory controller for active power regulation of parallel DC sources according to one or more embodiments. The system 200 includes two generators 206a, 206b that are arranged in parallel. While the illustrated example shows only two generators 206a, 206b, any number of parallel power sources can be utilized in one or more embodiments. The generators 206 can be wound field synchronous generators on an aircraft for example. The system 200 also includes a two rectifiers 208a, 208b which can be any type of rectifier circuit including, but not limited to, active and passive rectifiers. The rectifiers 208a, 208b convert the AC power from the generators 206a, 206b to DC power. In one or more embodiments, the DC power voltage is a high voltage DC (HVDC). The system 200 includes an impedance 210a, 210b to capture parasitic impedance of the feeders. In general, the bus includes feeder impedances (e.g. resistance and inductance between the generator and rectifier, as part of the rectifier/filter circuit, between the rectifier and point of common coupling (PCC), and between the PCC and the load. As shown in the system 200, the DC bus is commonly coupled to provide DC power to the load 220 at a point of common coupling 214. The DC bus can have a filter 218 attached between the point of common coupling 214 and the load 220 on the system 200. In some embodiments, the filter 218 can be positioned before the point of common coupling 214 of the DC bus, for example two filters could be directly after the two rectifiers 206a, 206b. The filter 218 can be any type of electronic filter.

In one or more embodiments, the generators 206a, 206b are controlled and operated by a generator controller 202a, 202b. Further, the generator controllers 202a, 202b are configured to receive current readings and/or signals from a first and second current sensing device 212a, 212b located between the respective generators 206a, 206b the point of common coupling 214 of the DC bus. In addition, the generator controllers 202a, 202b can receive current readings and/or signals from a third current sensing device 216 between the point of common coupling 214 of the DC bus and the load 220. The current sensing devices 212a, 212b, 216 can be any type of device operable to sense current values from a bus such as, for example, a hall effect sensor or a current sense resistor. In one or more embodiments, the individual currents Idc0, Idc1 can be routed to each generator controller 202a, 202b and internally summed to arrive at the total load current.

In one or more embodiments, the system 200 includes a supervisory controller 204. The supervisory controller 204 is configured to provide a load power percentage command to the generator controllers 202a, 202b which designates the percentage of the overall load power required from each generator 206a, 206b. The generator controllers 202a, 202b regulate the DC power to achieve the desired load share for each source. In one or more embodiments, the supervisory controller 204 can determine the appropriate load sharing command to provide based on aircraft operating conditions and one or more performance goals. For example, if the two generators 206a, 206b are connected to the low and high-spools of the engine respectively, the load sharing could be adjusted to minimize fuel burn. Another example includes a scenario where one of the generators is a battery source paralleled with a rectified generator. In this scenario, the load share could be a constant command so that the DC power tracks the state of charge of the battery as it discharges. That is to say, the generators 206a, 206b could be a battery source as well as an AC generator power source and/or any combination of power sources.

In one or more embodiments, the supervisory controller 204 provides the percentage load share for each generator controller 202a, 202b. The generator controllers 202a, 202b can receive current signals and/or current values from the first and second current sensing devices 212a, 212b as well as the third current sensing device 216. The third current sensing device 216 provides a current signal and/or current value for the overall current provided to the load after the point of common coupling 216. The first current sensing device 212a provides the current signal and/or value for the first power source and the second current sensing device 212b provides the current signal and/or current value for the second power source. The two generator controllers 202a, 202b uses the current signals and/or values to determine the appropriate command to regulate the power of the respective generators 206a, 206b to share the total load on the system at the percentage provided by the supervisory controller. In some embodiments, the supervisory controllers 204 can receive instructions from an exterior source (such as the pilot) as to the percentage of load share for the generators and/or power sources (in the case of a battery).

In one or more embodiments, the generator controllers 202a, 202b are configured to reduce or "droop" the voltage output of the generators 206a, 206b in the system 200 responsive to sensing a feedback current measured from the current sensing devices 212a, 212b and the total current on the load 220 measured from the third current sensing device 216. The generator controllers 202a, 202b adjust the droop of their respective generators 206a, 206b using the respective percentage command received from the supervisory controller 204. This could be implemented as an outer loop feedback regulator on the %Current (or Power), adjusting the voltage command to actively regulate power sharing. This could either boost and/or droop the voltage set-point, with appropriate limits as to how far the set-point can be adjusted given the system architecture and requirements.

Figure 3:
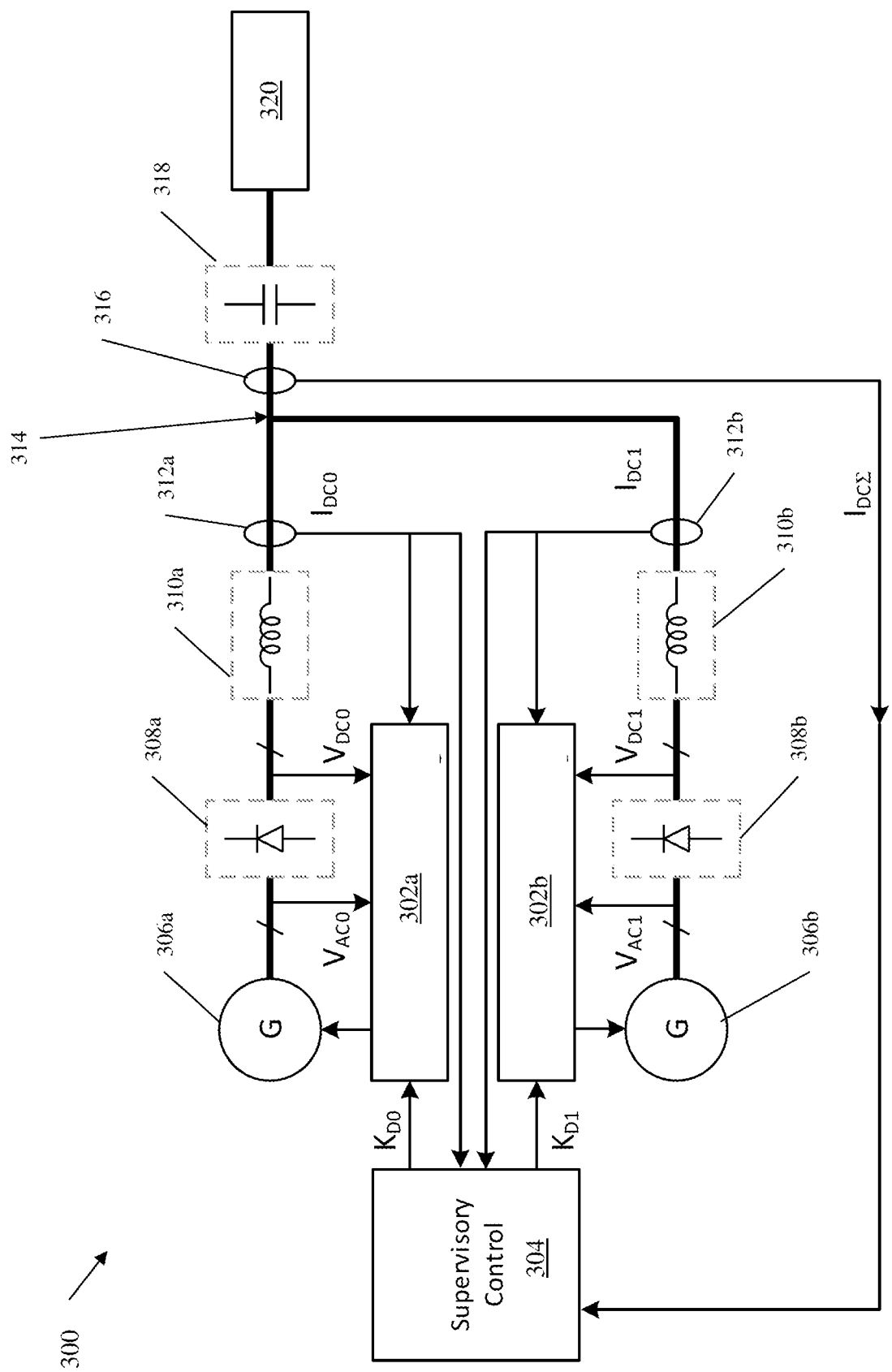
FIG. 3 depicts a block diagram of a system utilizing a supervisory controller for passive power regulation of parallel DC sources according to one or more embodiments.

FIG. 3 depicts a block diagram of a system utilizing a supervisory controller for passive power regulation of parallel DC sources according to one or more embodiments. The system 300 includes two generators 306a, 306b that are arranged in parallel. The generators 306 can be wound filed synchronous generators on an aircraft as discussed above. The system 300 also includes a two rectifiers 308a, 308b which can be any type of rectifier circuit including both active and passive rectifiers. The rectifiers 308a, 308b convert the AC power from the generators 306a, 306b to DC power. In one or more embodiments, the DC power voltage is a high voltage DC (HVDC). The system 300 includes an impedance 310a, 310b to capture parasitic impedance of the feeders. In general, the bus includes feeder impedances (e.g. resistance and inductance between the generator and rectifier, as part of the rectifier/filter circuit, between the rectifier and point of common coupling (PCC), and between the PCC and the load. As shown in the system 300, the DC bus is commonly coupled to provide DC power to the load 320 at a point of common coupling 314. The DC bus can have a filter 318 attached between the point of common coupling 314 and the load 320 on the system 300. In some embodiments, the filter 318 can be positioned before the point of common coupling 314 of the DC bus, for example two filters could be directly after the two rectifiers 308a, 308b. The filter 318 can be any type of electronic filter.

In one or more embodiments, the generators 306a, 306b are controlled and operated by a generator controller 302a, 302b. Further, the generator controllers 302a, 302b are configured to receive current readings and/or signals from a first and second current sensing device 312a, 312b located between the respective generators 306a, 306b the point of common coupling 314 of the DC bus. The current sensing devices 312a, 312b can be any type of device operable to sense current values from a bus such as, for example, a hall effect sensor or a current sense resistor In one or more embodiments, the system 300 includes a supervisory controller 304 which is configured to receive a current signal and/or value from the first and second current sensing devices 312a, 312b as well as a current signal and/or value from a third current sending device 306 located after the point of common coupling 314 of the DC bus. The supervisory controller 304 analyzes the current signals and/or values to determine a voltage adjustment for the generator controllers 302a, 302b. The voltage adjustment can droop and/or boost the voltage output. In one or more embodiments, the voltage adjustment can be done in at least three ways including (1) boosting a voltage on the first generator 306a and drooping a voltage on the second generator 306b; (2) boosting a voltage on the first generator 306a and leaving the second generator 306b unchanged; and (3) drooping the voltage on the first generator 306a and leaving the second generator 306b unchanged. Droop refers to the reduction of the voltage output of the generators 306a, 306b for load sharing. Increasing the voltage can be a gain calculation passed on to the generator controllers 302a, 302b. The calculation of the droop/increase gain is performed at the supervisory controller 304 and passed to the generator controllers 302a, 302b to reduce or increase the voltage accordingly. In one or more embodiments, the supervisory controller 304 can determine the voltage adjustment value and/or gain command to provide based on aircraft operating conditions and one or more performance goals for the aircraft.

In one or more embodiments, the generator controllers 202a, 202b, 302a, 302b and/or supervisory controller 204, 304 can receive DC current values from the current sensing devices 212a, 212b, 216, 312a, 312b, 316 at a defined sampling rate. An exemplary sampling rate could be between 50-100 μs. Any sampling rate can be utilized herein.

In one or more embodiments, the generator controllers 202a, 202b, 302a, 302b and supervisory controllers 204, 304 or any of the hardware referenced in the systems 200, 300 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a first direct current (DC) power supply comprising a first generator and a first rectifier circuit;
   a second DC power supply, wherein a first output of the first DC power supply and a second output of the second DC power supply are commonly coupled at a common bus point;
   a first generator controller configured to operate the first DC power source;
   a first current sensing device coupled between the first output of the first DC power supply and the common bus point;
   a second current sensing device coupled between the common bus point and a load;
   a supervisory controller communicatively coupled to the first generator controller, wherein the supervisory controller is configured to:
      receive a first current signal from the first current sensing device;
      receive a second current signal from the second current sensing device;
      determine a first voltage adjustment value for the first DC power supply based on the first current signal and the second current signal; and
      command the first generator controller to operate the first DC power supply to adjust a first voltage output of the first DC power supply by the first voltage adjustment value.

2. The system of claim 1, wherein the first DC power supply is in parallel with the second DC power supply.

3. The system of claim 1, further comprising a second generator controller configured to operate the second DC power source;
   a third current sending device coupled between the second output of the second DC power supply and the common bus point.

4. The system of claim 3, wherein the supervisory controller is communicatively coupled to the second generator controller, and wherein the supervisory controller is further configured to:
   receive a third current signal from a third current sensing device;
   receive the second current signal from the second current sensing device;
   determine a second voltage adjustment value for the second DC power supply based on the third current signal and the second current signal; and
   command the second generator controller to operate the second DC power supply to adjust a second voltage output of the second DC power supply by the second voltage adjustment value.

5. The system of claim 4, wherein the second DC power supply comprises a second generator and a second rectifier circuit.

6. The system of claim 1 further comprising an electronic filter coupled between the common bus point and the load.

7. The system of claim 1, wherein the first DC power supply is housed on an aircraft; and
   wherein the first voltage adjustment value is determined based on one or more performance goals of the aircraft.

8. The system of claim 1, wherein the second DC power supply comprises a battery.

9. The system of claim 1, wherein the first current sensing device comprises a hall effect sensor.

10. The system of claim 1, wherein the first generator comprises a permanent magnet generator.

* * * * *